(12) United States Patent
Bao et al.

(10) Patent No.: US 11,015,280 B2
(45) Date of Patent: May 25, 2021

(54) FLOW PATH SWITCHER AND LIQUID DETERGENT DELIVERY DEVICE

(71) Applicant: HANGZHOU KAMBAYASHI ELECTRONICS CO., LTD., Hangzhou (CN)

(72) Inventors: Pengfei Bao, Hangzhou (CN); Yilei Wang, Hangzhou (CN); Hongwei Yu, Hangzhou (CN)

(73) Assignee: Hangzhou Kambayashi Electronics Co., Ltd., Hangzhou (CN)

( * ) Notice: Subject to any disclaimer, the term of this patent is extended or adjusted under 35 U.S.C. 154(b) by 139 days.

(21) Appl. No.: 16/303,508

(22) PCT Filed: Sep. 7, 2017

(86) PCT No.: PCT/CN2017/100845
§ 371 (c)(1),
(2) Date: Nov. 20, 2018

(87) PCT Pub. No.: WO2018/059205
PCT Pub. Date: Apr. 5, 2018

(65) Prior Publication Data
US 2020/0032448 A1    Jan. 30, 2020

(30) Foreign Application Priority Data

Sep. 30, 2016 (CN) .......................... 201610866639.7

(51) Int. Cl.
*D06F 39/02* (2006.01)
*D06F 33/00* (2020.01)
(Continued)

(52) U.S. Cl.
CPC .............. *D06F 39/02* (2013.01); *D06F 33/00* (2013.01); *A47L 15/4454* (2013.01);
(Continued)

(58) Field of Classification Search
CPC ........ D06F 39/02; D06F 39/022; D06F 33/00; D06F 39/088; D06F 39/12; F16K 11/0787; A47L 15/4454
See application file for complete search history.

(56) References Cited

U.S. PATENT DOCUMENTS

2003/0140966 A1\* 7/2003 Kempf .................... E03B 7/045
137/337
2004/0194825 A1\* 10/2004 Kempf .................... E03B 7/045
137/337
(Continued)

FOREIGN PATENT DOCUMENTS

CN          1340670 A      3/2002
CN          103898715 A    7/2014
(Continued)

*Primary Examiner* — Benjamin L Osterhout
(74) *Attorney, Agent, or Firm* — Muncy, Geissler, Olds & Lowe, P.C.

(57) ABSTRACT

Disclosed herein is a flow path switcher, comprising a valve core, a shell and a base. The shell comprises a valve seat A, a valve seat B, a channel of valve seat A, a channel of valve seat B, an outlet and an inlet. The base comprises a valve seat C, the valve seat A and the valve seat B are located on one side of the valve core and the valve seat C is located on the other side of the valve core. Also a liquid detergent delivery device with the flow path switcher is disclosed, comprising a main channel, a piston, a one-way valve D, a one-way valve E, a detergent box A and a Venturi negative pressure generator. The flow path switcher is connected between the entrance of the Venturi negative pressure generator and the exit of the main channel, the inlet of the flow path switcher and the outlet of the flow path switcher are connected to the exit of the main channel and the entrance of the Venturi negative pressure generator, respectively, the channel of valve seat B is connected to the exit of the one-way valve D, the exit of the one-way valve D is (Continued)

connected to the entrance of the piston, the entrance of the one-way valve D is connected to the detergent box A, the exit of the piston is connected to the entrance of the one-way valve E, and the exit of the one-way valve E is connected to the negative pressure port of the Venturi negative pressure generator. The present invention is used for delivery of detergents of washing machines.

7 Claims, 6 Drawing Sheets

(51) Int. Cl.
*A47L 15/44* (2006.01)
*D06F 39/08* (2006.01)
*D06F 39/12* (2006.01)
*F16K 11/078* (2006.01)

(52) U.S. Cl.
CPC ............ *D06F 39/088* (2013.01); *D06F 39/12* (2013.01); *F16K 11/0787* (2013.01)

(56) References Cited

U.S. PATENT DOCUMENTS

| | | |
|---|---|---|
| 2007/0044850 A1 | 3/2007 | Pieters |
| 2007/0114290 A1* | 5/2007 | Kempf ............... G05D 23/1333 236/12.13 |
| 2010/0139779 A1* | 6/2010 | Lautzenheiser ........... F16K 7/12 137/14 |

FOREIGN PATENT DOCUMENTS

| | | |
|---|---|---|
| CN | 205046366 U | 2/2016 |
| CN | 206289430 U | 6/2017 |
| JP | 2002294814 A | 10/2002 |

\* cited by examiner

FLOW PATH SWITCHER AND LIQUID DETERGENT DELIVERY DEVICE

FIELD OF THE INVENTION

The present invention relates to a delivery device of liquid preparation, in particular, to a device for automatically delivering detergent to the washing machine.

BACKGROUND

As the pace of life is accelerated and the consumers' energy-saving awareness is improved, they pay more attention to the energy-saving and convenient function and feature when purchasing domestic electrical appliances. As a domestic electrical appliance that is frequently used, being energy-saving and convenient has become an important factor for the consumers to choose and purchase washing machines. Therefore, washing machines with a function of automatically delivering detergent are favored by the consumers increasingly. At present, when we use a common washing machine on the market to wash clothes, we often need to deliver detergent manually, so the dosage is hard to control. If it is small, the washing effect will be poor and the cleaning ratio will be slightly low; and if it is large, detergent is wasted and the rinsing difficulty is also increased, water and electricity are wasted and the wear degree of clothes is increased, and the cost for a single clothes washing is increased. On this basis, manufacturers successively launch washing machines where the detergent is delivered automatically.

The automatic detergent delivery device of the washing machine is now primarily designed on the basis of two thoughts: the first one is to utilize the arrangement of the inlet tube and the detergent delivery pipeline. When the influent water flow flows, the detergent delivery pipeline will produce a Venturi negative pressure effect, and under such a negative pressure, detergent is sucked in the delivery tube for delivery; and the second one is to use various liquid pumps to pump detergent so as to achieve the delivery of detergent. For automatic detergent delivery devices designed on the basis of the above thoughts, it is difficult to accurately measure the delivered detergent because the viscosity of detergent under different temperature differs greatly. When the environment temperature is low, the viscosity is large, and due to the increase of load, the rotating speed of the drive motor of the device is reduced and the addition quantity is also reduced; and when the environment temperature is high, the viscosity is small, and due to the decrease of load, the rotating speed of the drive motor is increased and the addition quantity is also increased, thus it is difficult to accurately measure the delivery quantity.

CN101381939B document discloses a washing machine where detergent is delivered automatically, comprising a wash bucket, a control panel with cloth control key, a weight sensor, a temperature sensor, a water hardness sensor, a washing water turbidity sensor, a detergent box and a computer board; the detergent box is comprised of an upper storage box and a lower dilution box, and the computer board is used to control the quantity of detergent entering the dilution box from the storage box according to the detection results of each sensor. In this technical solution, the structure is complicated and the cost is high.

CN102605589B document discloses an automatic delivery device based on the detergent concentration, comprising an automatic detergent delivery device and a detergent storage container, and further comprising a quantitative dissolution container above which an inlet tube is connected, and an inlet valve is installed on the other end of the inlet tube, and the inlet valve is connected to the controller of the washing machine; the storage container is connected to the automatic delivery device, and the automatic delivery device is connected to the storage container and the controller; there is an overflow hole above the quantitative dissolution container, a probe is installed on the overflow hole and the probe is connected to the controller, and the overflow hole is connected to the wash bucket through the conduit; an outlet valve is installed on the bottom of the quantitative dissolution container, and the outlet valve is connected to the wash bucket and the controller. In this technical solution, the delivery quantity of detergent cannot be controlled flexibly according to washing conditions and the control accuracy is not good enough, and the structure is complicated, so it remains to be improved.

CN103122569A document discloses an automatic detergent delivery device for washing machines, comprising a microprocessor and an inlet pipeline. An inlet valve, a constant volume box and a detergent box are set successively on the inlet pipeline, and the exit end of the detergent box is connected to the wash bucket; the inlet valve is connected electrically to the microprocessor, a conveying device for introducing detergent is set on the inlet pipe of the constant volume box, and the conveying device is connected to the storage tank for containing detergent. In this technical solution, we need to start the conveying device first to introduce the detergent to the constant volume box for quantification and then close it, and open the inlet valve to wash the detergent into the detergent box. Such operating process is very complicated, and there is a time-lag effect to some extent. Moreover, we need to start the conveying device more than once to weigh the detergent, and to wash the detergent into the box more than once, so the process is complicated and the efficiency is low.

CN203834223U document discloses a detergent delivery controller. The end of its main channel is an entrance for water inflow, and the other end is an exit that can be connected to the liquid inlet of the wash bucket. It is characterized in that a valve A, valve B, valve C, valve D, pump and nozzle are provided. The entrance of valve A is connected to the bypass orifice A of the main channel, the entrance of valve B can be connected to the storage box of detergent A, the exits of valve A and valve B are connected to the entrance of valve C, the entrance of valve D can be connected to the storage box of detergent B, the exits of valve C and valve D are connected to the entrance of the pump, and the exit of the pump is connected to the bypass orifice B of the main channel. The relative position of the bypass orifice A and the bypass orifice B is as follows: the bypass orifice A is relatively close to the entrance of the main channel and the bypass orifice B is relatively close to the exit of the main channel, and the nozzle is connected to the main channel in series and located between the bypass orifice A and the bypass orifice B. This controller must use the electromagnetic valve to control the delivery of detergent, relatively increasing the quantity of circuits controlled by the electromagnetic valve.

SUMMARY

To solve the problems of the device for automatically delivering the detergent to the washing machine in complicated structure and high cost in the prior art, the present invention provides a flow path switcher and a liquid detergent delivery device, which are simple in structure and low in cost.

To solve the above problems, the technical solution 1 adopted in the present invention is a flow path switcher, and the technical solution 2 is a liquid detergent delivery device with the flow path switcher.

A flow path switcher described in the present invention, whose specialness is that: the flow path switcher comprises a valve core, a shell and a base. The shell comprises a valve chamber, a valve seat A, a valve seat B, a channel of valve seat A, a channel of valve seat B, an outlet and an inlet connected to the channel of valve seat A. The base comprises a valve seat C and an air vent. The valve seat A and the valve seat B are located on one side of the valve core and correspond to this side of the valve core. The valve seat C is located on the other side of the valve core. The valve seat A and the valve core form a valve A, the valve seat B and the valve core form a valve B, and the valve seat C and the valve core form a valve C.

The flow path switcher can be:

a. The distance between the edge of the valve seat B and the valve core is less than that between the edge of the valve seat A and the valve core.

b. The valve core is an elastic body.

c. The valve seat B is nested inside the valve seat A.

d. The valve seat B is located on one side of the valve seat A adjacently.

A liquid detergent delivery device with the flow path switcher described in the present invention, whose specialness is that: comprising a main channel, a piston, a one-way valve D, a one-way valve E, a detergent box A and a Venturi negative pressure generator. The entrance of the main channel is connected with an inlet valve, and the exit of the Venturi negative pressure generator is connected with the water inlet of the wash bucket. The flow path switcher is connected between the entrance of the Venturi negative pressure generator and the exit of the main channel, wherein the inlet of the flow path switcher is connected to the exit of the main channel, the outlet of the flow path switcher is connected to the entrance of the Venturi negative pressure generator, the channel of valve seat B of the flow path switcher is connected to the exit of the one-way valve D, the exit of the one-way valve D is connected to the entrance of the piston, the entrance of the one-way valve D is connected to the detergent box A, the exit of the piston is connected to the entrance of the one-way valve E, and the exit of the one-way valve E is connected to the negative pressure port of the Venturi negative pressure generator.

For the liquid detergent delivery device, a two-position three-way valve and a one-way valve F can be connected between the exit of the one-way valve D and the entrance of the piston, and the exit of the two-position three-way valve is connected to the entrance of the one-way valve F, the exit of the one-way valve F is connected to the entrance of the piston, the entrance 1 of the two-position three-way valve is connected to the exit of the one-way valve D, a detergent box B is provided, and the entrance 2 of the two-position three-way valve is connected to the detergent box B.

In the present invention, the original electromagnetic switching valve which has complicated structure and high cost and needs electronic control is replaced by a mechanical one-way valve without electronic control, to simplify control and save cost. For the detergent delivery device in the prior art, when the tap-water pipe network is under a negative pressure, detergent inside the detergent box will be pumped to the water supply pipe network. Even if a one-way valve is used to prevent this situation, but as the failure risk of the one-way valve is relatively large, once it loses efficacy, detergent may still be pumped to the water supply pipe network. The one-way valve D described in the present invention can be used to prevent detergent from being pumped to the water supply pipe network. In the present invention, a one-way valve F is provided. When the one-way valve D loses efficacy, the one-way valve E can be used to prevent detergent from being pumped out, and air can be added from the one-way valve F to destroy the vacuum inside the flow path switcher, so as to prevent detergent from being pumped to the tap water pipe network.

The present invention is further described below in connection with embodiments thereof with reference to the accompanying drawings.

MARKS AND CORRESPONDING PARTS SHOWN IN THE FIGURES 1 flow path switcher, 1-1 valve core, 1-2 shell, 1-21 valve seat A, 1-22 valve seat B, 1-23 channel of valve seat A, 1-24 channel of valve seat B, 1-25 outlet, 1-26 valve chamber, 1-27 inlet, 1-3 base, 1-31 valve seat C, 1-32 air vent, 1-4 valve A, 1-5 valve B, 1-6 valve C, 2 main channel, 3 one-way valve D, 4 detergent box A, 5 one-way valve E, 6 piston, 7 Venturi negative pressure generator, 7-1 exit, 7-2 entrance, 7-3 negative pressure port, 8 inlet valve, 9 detergent box B, 10 pipeline, 11 two-position three-way valve, 11-1 exit, 11-2 entrance 1, 11-3 entrance 2, 12 one-way valve F.

DETAILED DESCRIPTION

Example 1

Figure 7:
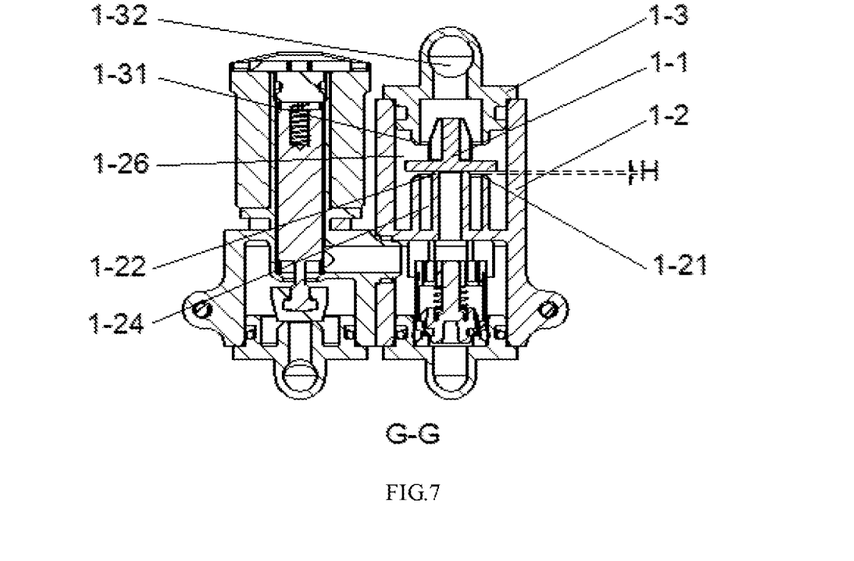
FIG. 7 is a G-G section view of FIG. 5, i.e. a G-G section view of a form of the flow path switching in the present invention.
Figure 8:
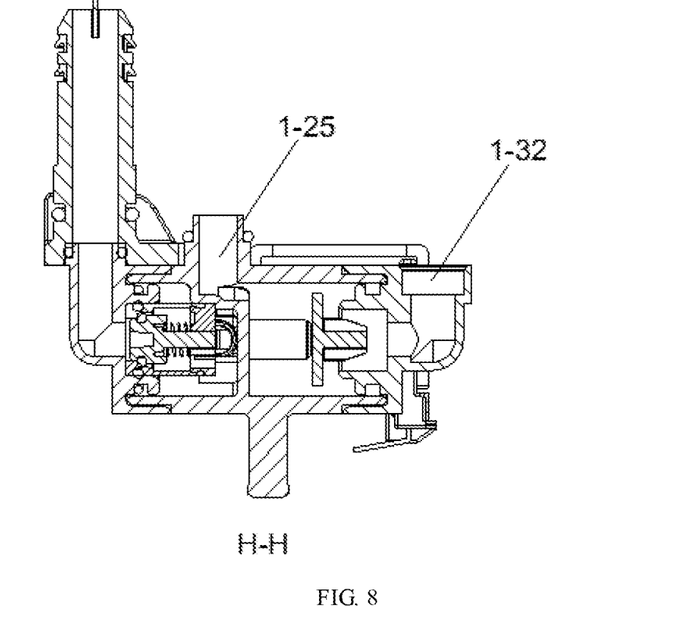
FIG. 8 is an H-H section view of FIG. 5, i.e. an H-H section view of the other form of the flow path switching in the present invention.
Figure 9:
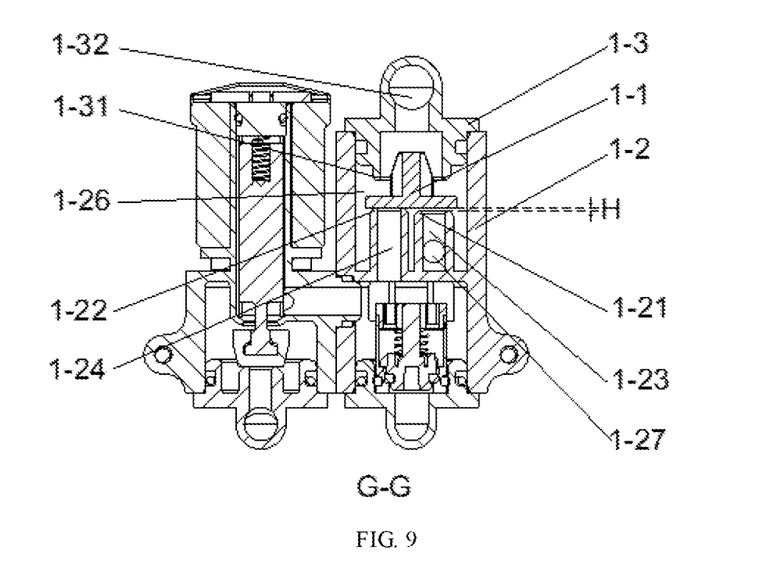
FIG. 9 is a G-G section view of FIG. 5, i.e. a G-G section view of the other form of the flow path switching in the present invention.

A flow path switcher. The flow path switcher 1 comprises a valve core 1-1, a shell 1-2 and a base 1-3. The shell 1-2 comprises a valve chamber 1-26, a valve seat A1-21, a valve seat B1-22, a channel of valve seat A 1-23, a channel of valve seat B 1-24, an outlet 1-25 and an inlet 1-27 connected with the channel of valve seat A 1-23. The base 1-3 comprises a valve seat C1-31 and a 和 air vent 1-32. The valve seat A1-21 and the valve seat B1-22 are located on one side of the valve core 1-1 and correspond to this side of the valve core, and can be covered by this side of the valve core. The valve seat C1-31 is located on the other side of the valve core. The valve seat A1-21 and the valve core 1-1 form a valve A1-4, the valve seat B1-22 and the valve core 1-1 form a valve B1-5, and the valve seat C1-31 and the valve core 1-1 form a valve C1-6; the valve A, the valve B and the valve C are non-electromagnetic mechanical valves. The distance between the edge of the valve seat B1-22 and the valve core 1-1 is less than that between the edge of the valve seat A1-21 and the valve core 1-1, that is to say, the valve seat B is higher than the valve seat A for a small distance H; and the valve core 1-1 is an elastic body. The valve seat B1-22 can be nested inside the valve seat A1-21, see FIG. 7, and the valve seat B1-22 can also be located on one side of the valve seat A1-21 adjacently, see FIG. 9.

Example 2

Figure 1:
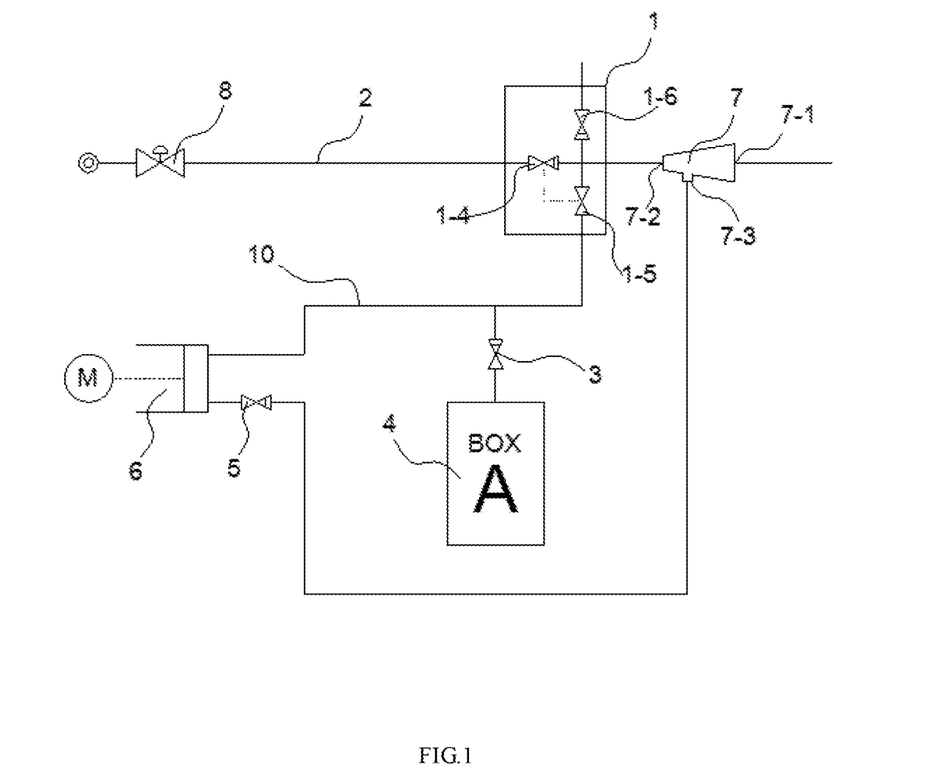
FIG. 1 is a schematic diagram of the structure of a liquid detergent delivery device in the present invention.

A liquid detergent delivery device with the flow path switcher described in Example 1, see FIG. 1, comprising a main channel 2, a piston 6, a one-way valve D3, a one-way valve E5, a detergent box A 4 and a Venturi negative pressure generator 7. The entrance of the main channel 2 is connected with an inlet valve 8, and the exit of the Venturi negative pressure generator 7-1 is connected with the water inlet of the wash bucket. The flow path switcher is connected between the entrance of the Venturi negative pressure generator 7-2 and the exit of the main channel, wherein the inlet of the flow path switcher 1-27 is connected to the exit of the main channel, the outlet of the flow path switcher 1-25 is connected to the entrance of the Venturi negative pressure generator, the channel 1-24 of the valve seat B of the flow path switcher is connected to the exit of the one-way valve D3, the exit of the one-way valve D3 is connected to the entrance of the piston 6, the entrance of the one-way valve D3 is connected to the detergent box A 4, the exit of the piston 6 is connected to the entrance of the one-way valve E5, and the exit of the one-way valve E5 is connected to the negative pressure port 7-3 of the Venturi negative pressure generator. The one-way valve D and the one-way valve E are both non-electromagnetic mechanical valves.

Process of Using the Device:

1 Delivery of detergent A: when the electric motor drives the piston 6 to move towards the left, the pressure inside the piston cylinder is reduced, the one-way valve D3 is opened and the one-way valve E5 is closed. Because the channel 1-24 of valve B is connected to the exit of the one-way valve D, the other side of the valve core 1-1 corresponds to the valve seat C1-31, and the channel of valve seat C is connected to the air vent 1-32, see FIG. 7 and FIG. 9, under the action of atmospheric pressure, the valve core is pushed to the valve seat B, so the valve B1-5 is closed, and detergent A in the detergent box A 4 is pumped to the pipeline 10. When the electronic motor drives the piston 6 to move towards the right, the pressure inside the piston cylinder is increased, the one-way valve D3 is closed and the one-way valve E5 is opened, then detergent A that was pumped to the pipeline 10 just now flows out through the one-way valve E5, and flows in through the negative pressure port 7-3 of the Venturi negative pressure generator 7 and flows out from the exit 7-1 of the Venturi negative pressure generator. Repeatedly, detergent A in the liquid box A can be pumped out.

2 Rinsing: when the inlet valve 8 is opened, water flow flows out through the main channel 2, the flow path switcher 1 and the Venturi negative pressure generator 7. When water flow flows through the valve A1-4 in the flow path switcher, the valve B1-5 is opened under the action of water flow, and water flow flows out through the valve B and enters the pipeline 10. At the same time, when water flow flows through the entrance 7-2 and the exit 7-1 of the Venturi negative pressure generator 7, due to Venturi effect, the pressure of the negative pressure port 7-3 of the Venturi negative pressure generator is less than that of the exit of the inlet valve 8, and water entering the pipeline 10 will flow through the piston cylinder, the one-way valve E5 and the negative pressure port 7-3 of the Venturi negative pressure generator and flow into the main water flow, then flows out from the system so as to rinse the detergent thoroughly out of the system. The valve seat B is higher than the valve seat A for a small distance H, so during delivery of detergent, the valve B can reliably prevent air from being pumped to the pipeline. Therefore the valve B must be closed first during delivery. Even if the valve A is not closed, the function of the device will not be affected either.

When the valve core is a non-elastic body, the valve A cannot be closed.

When the valve core is an elastic body, the valve A can also be closed. In this way, when the inlet 1-27 is under a negative pressure, the negative pressure cannot be transmitted to the system.

Example 3

Figure 2:
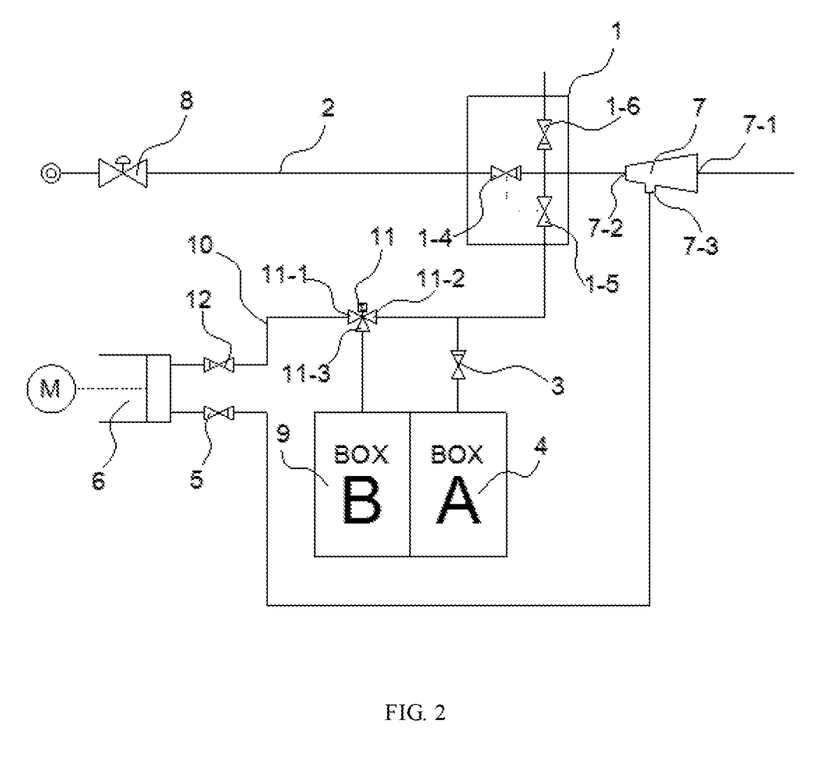
FIG. 2 is a schematic diagram of the other structure of a liquid detergent delivery device in the present invention.
Figure 3:
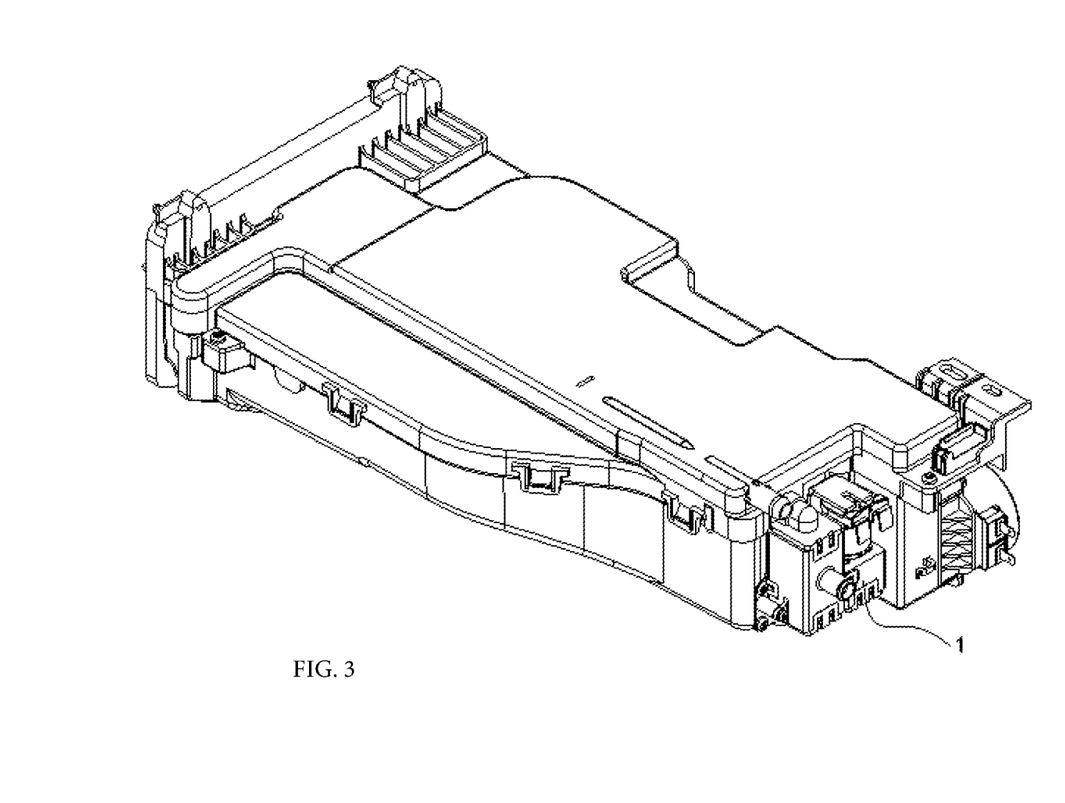
FIG. 3 is an outside view of a liquid detergent delivery device in the present invention.
Figure 4:
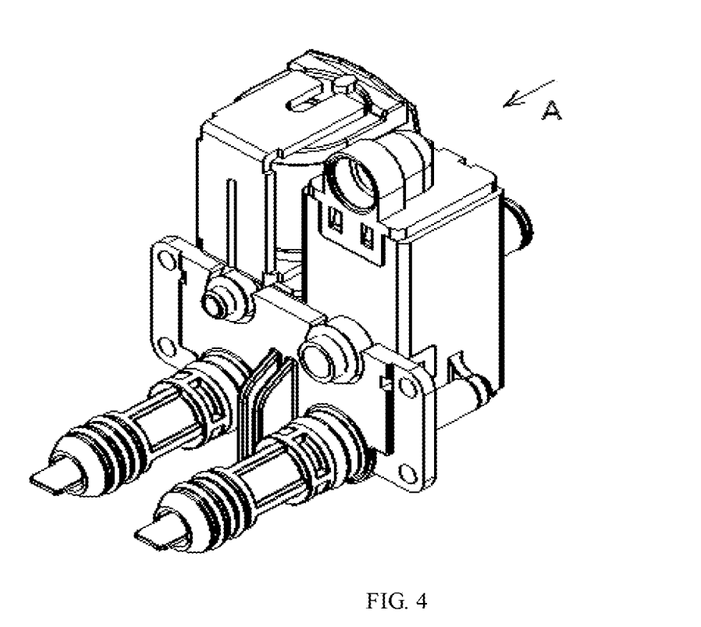
FIG. 4 is an outside view of a flow path switcher in the present invention.
Figure 5:
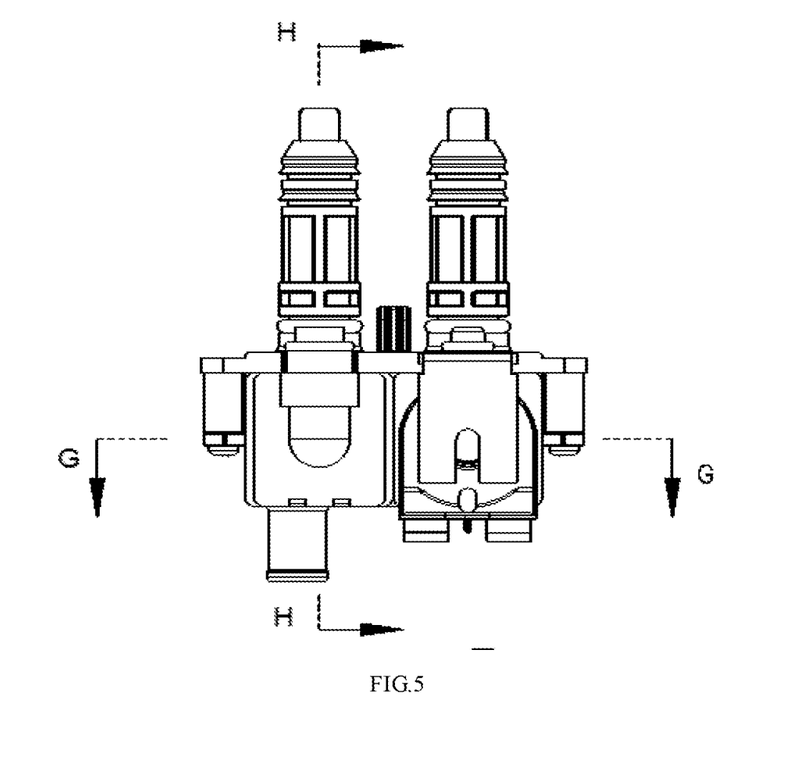
FIG. 5 is a top view of the flow path switcher of A direction view in FIG. 4.
Figure 6:
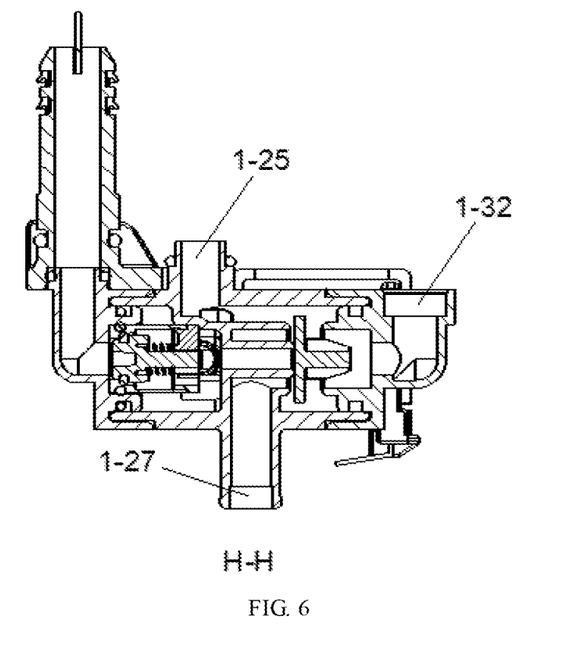
FIG. 6 is an H-H section view of FIG. 5, i.e. an H-H section view of a form of the flow path switching in the present invention.

A liquid detergent delivery device with the flow path switcher described in Example 1, see FIG. 2. The difference between this Example and Example 2 is that a two-position three-way valve 11 and a one-way valve F12 are connected between the exit of the one-way valve D3 and the entrance of the piston 6, and the one-way valve F is a non-electromagnetic mechanical valve. The exit of the two-position three-way valve 11-1 is connected to the entrance of the one-way valve F, the exit of the one-way valve F is connected to the entrance of the piston 6, the entrance 1 of the two-position three-way valve 11-2 is connected to the exit of the one-way valve D3, a detergent box B 9 is provided, and the entrance 2 of the two-position three-way valve 11-3 is connected to this detergent box B 9.

Process of Using the Device:

1 Delivery of detergent A: the two-position three-way valve 11 is not powered on, the exit 11-1 of the two-position three-way valve is connected to the entrance 1 11-2 and disconnected to the entrance 2 11-3. When the electric motor drives the piston 6 to move towards the left, the pressure inside the piston cylinder is reduced, the one-way valve D3 and the one-way valve F12 are opened, the one-way valve E5 and the valve B1-5 are closed, detergent A in the detergent box A 4 is pumped to the pipeline 10. When the electronic motor drives the piston to move towards the right, the pressure inside the piston cylinder is increased, the one-way valve F12 is closed and the one-way valve E5 is opened, then detergent A that was pumped to the pipeline 10 just now flows out through the one-way valve E5, and flows in through the negative pressure port 7-3 of the Venturi negative pressure generator 7 and flows out from the exit 7-1 of the Venturi negative pressure generator. Repeatedly, detergent A in the liquid box A can be pumped out.

2 Delivery of detergent B: the two-position three-way valve 11 is powered on, the exit 11-1 of the two-position three-way valve is connected to the entrance 2 11-3 and disconnected to the entrance 1 11-2. When the electric motor drives the piston 6 to move towards the left, the pressure inside the piston cylinder is reduced, the one-way valve F12 is opened, the one-way valve E5 is closed, detergent B in the detergent box B 9 is pumped to the pipeline 10. When the electronic motor drives the piston to move towards the right, the pressure inside the piston cylinder is increased, the one-way valve F12 is closed and the one-way valve E5 is opened, then detergent B that was pumped to the pipeline 10 just now flows out through the one-way valve E5, and flows in through the negative pressure port 7-3 of the Venturi negative pressure generator 7 and flows out from the exit 7-1 of the Venturi negative pressure generator. Repeatedly, detergent B in the liquid box B can be pumped out.

3 Rinsing: the two-position three-way valve 11 is not powered on, the exit 11-1 of the two-position three-way valve is connected to the entrance 1 11-2 and disconnected to the entrance 2 11-3. When the inlet valve 8 is opened, water flow flows out through the main channel 2, the flow path switcher 1 and the Venturi negative pressure generator 7. When water flow flows through the valve A1-4 in the flow path switcher, the valve B1-5 is opened under the action of water flow, and water flow flows out through the valve B and enters the pipeline 10. At the same time, when water flow flows through the entrance 7-2 and the exit 7-1 of the Venturi negative pressure generator 7, due to Venturi effect, the pressure of the negative pressure port 7-3 of the Venturi negative pressure generator is less than that of the exit of the inlet valve 8, and water entering the pipeline 10 will flow through the two-position three-way valve 11, the one-way valve F12, the piston cylinder, the one-way valve E5 and the negative pressure port 7-3 of the Venturi negative pressure generator and flow into the main water flow, then flows out from the system so as to rinse the detergent thoroughly out of the system.

The invention claimed is:

1. A flow path switcher, wherein the flow path switcher comprises:
   a valve core;
   a shell; and
   a base,
   wherein the shell comprises:
   a valve chamber;
   a valve seat A;
   a valve seat B;
   a channel of the valve seat A;
   a channel of the valve seat B;
   an outlet; and
   an inlet connected to the channel of the valve seat A,
   wherein the base comprises:
   a valve seat C; and
   an air vent,
   wherein the valve seat A and the valve seat B are located on one side of the valve core and correspond to the one side of the valve core, the valve seat C is located on an other side of the valve core, the valve seat A and the valve core form a valve A, the valve seat B and the valve core form a valve B, and the valve seat C and the valve core form a valve C.

2. The flow path switcher according to claim 1, wherein a distance between an edge of the valve seat B and the valve core is less than a distance between an edge of the valve seat A and the valve core.

3. The flow path switcher according to claim 2, wherein the valve core is an elastic body.

4. The flow path switcher according to claim 2, wherein the valve seat B is nested inside the valve seat A.

5. The flow path switcher according to claim 2, wherein the valve seat B is located on one side of the valve seat A adjacently.

6. A liquid detergent delivery device with the flow path switcher according to claim 1, comprising:
   a main channel;
   a piston;
   a one-way valve D;
   a one-way valve E;
   a detergent box A; and
   a Venturi negative pressure generator,
   wherein an entrance of the main channel is connected with an inlet valve, and an exit of the Venturi negative pressure generator is connected with a water inlet of a wash bucket, the flow path switcher is connected between an entrance of the Venturi negative pressure generator and an exit of the main channel, wherein the inlet of the flow path switcher is connected to the exit of the main channel, the outlet of the flow path switcher is connected to the entrance of the Venturi negative pressure generator, the channel of the valve seat B of the flow path switcher is connected to an exit of the one-way valve D, the exit of the one-way valve D is connected to an entrance of the piston, an entrance of the one-way valve D is connected to the detergent box A, an exit of the piston is connected to an entrance of the one-way valve E, and an exit of the one-way valve E is connected to a negative pressure port of the Venturi negative pressure generator.

7. The liquid detergent delivery device according to claim 6, wherein a two-position three-way valve and a one-way valve F are connected between the exit of the one-way valve D and the entrance of the piston, and an exit of the two-position three-way valve is connected to an entrance of the one-way valve F, an exit of the one-way valve F is connected to the entrance of the piston, a first entrance of the two-position three-way valve is connected to the exit of the one-way valve D, a detergent box B is provided, and a second entrance of the two-position three-way valve is connected to the detergent box B.

* * * * *